United States Patent [19]

Fibiger et al.

[11] Patent Number: 4,769,148

[45] Date of Patent: Sep. 6, 1988

[54] NOVEL POLYAMIDE REVERSE OSMOSIS MEMBRANES

[75] Inventors: Richard F. Fibiger, Midland, Mich.; Ja-young Koo, Plymouth, Minn.; David J. Forgach, Midland, Mich.; Robert J. Petersen, Minneapolis, Minn.; Donald L. Schmidt; Ritchie A. Wessling, both of Midland, Mich.; Thomas F. Stocker, St. Paul, Minn.

[73] Assignee: The Dow Chemical Company, Midland, Mich.

[21] Appl. No.: 122,307

[22] Filed: Nov. 18, 1987

[51] Int. Cl.$^4$ ............................................. B01D 13/00
[52] U.S. Cl. ................................ 210/500.38; 528/312; 528/363
[58] Field of Search ..................... 210/500.37, 500.38; 528/310, 312, 314, 315, 323, 332, 340, 342, 363; 525/434, 437

[56] References Cited

U.S. PATENT DOCUMENTS

| | | |
|---|---|---|
| 3,567,632 | 8/1969 | Richter et al. |
| 3,600,350 | 8/1971 | Kwolek |
| 3,687,842 | 8/1972 | Credali et al. |
| 3,696,031 | 10/1972 | Credali et al. |
| 3,744,642 | 7/1973 | Scala et al. |
| 3,878,109 | 4/1975 | Ikeda et al. |
| 3,904,519 | 9/1975 | McKinney, Jr. et al. |
| 3,926,798 | 12/1975 | Cadotte |
| 3,948,823 | 4/1976 | Lee et al. |
| 3,951,789 | 4/1976 | Lee et al. |
| 3,951,815 | 4/1976 | Wrasidlo |
| 3,993,625 | 11/1976 | Kurihara et al. |
| 4,005,012 | 1/1977 | Wrasidlo |
| 4,039,440 | 8/1977 | Cadotte |
| 4,137,219 | 1/1979 | Idel et al. .............................. 525/437 |
| 4,142,035 | 2/1979 | Idel et al. .............................. 525/434 |
| 4,259,183 | 3/1981 | Cadotte |
| 4,277,344 | 7/1981 | Cadotte |
| 4,302,336 | 11/1981 | Kawaguchi et al. |
| 4,337,154 | 6/1982 | Fukuchi et al. |
| 4,337,185 | 6/1982 | Wessling et al. |
| 4,387,024 | 6/1983 | Kurihara et al. |
| 4,426,489 | 1/1984 | Wessling et al. |
| 4,525,526 | 6/1985 | Wessling et al. |

*Primary Examiner*—Frank Sever

[57] ABSTRACT

An improved composite polyamide membrane and methods of making the membrane are described. This improved membrane is prepared using a cationic polymeric wetting agent in an aqueous solution containing a polyfunctional amine reactant which is interfacially polymerized with an acyl halide to form a thin film polyamide discriminating layer on a microporous support. Alternatively, the wetting agent can be applied directly to the substrate and the interfacial polymerization can occur on said treated substrate. The resulting membrane exhibits an unexpected combination of high water flux, high rejection of divalent anion salts, variable sodium chloride rejection and good caustic resistance at low operating pressures. In one embodiment of this invention, a porous substrate is first treated with an aqueous piperazine solution containing a copolymer of vinylbenzyl dimethyl sulfonium chloride and methacrylic acid and then the coated microporous support is contacted with trimesoyl chloride in an organic solvent.

6 Claims, No Drawings

NOVEL POLYAMIDE REVERSE OSMOSIS MEMBRANES

BACKGROUND OF THE INVENTION

This invention relates to polyamide membranes prepared by interfacial polymerization of a water-soluble polyfunctional amine and a substantially water-insoluble polyfunctional acyl halide and methods for making the same.

Reverse osmosis membranes have been prepared from a variety of polymeric materials, including polyamides. Polyamide membranes are described in U.S. Pat. Nos. 3,567,632; 3,600,350; 3,687,842: 3,696,031: 3,878,109; 3,904,519; 3,948,823; 3,951,789: 3,993,625: 4,302,336; 4,337,154 and 4,387,024. These polyamide membranes are generally substantially linear polymers and exhibit relatively low water fluxes.

Asymmetric membranes are typically prepared by dissolving a polymer in a suitable solvent and casting the polymer in the form of films or fibers and then quenching the same in water to form the membranes. In addition, polyamide composite membranes have been described in the prior art. Examples of such membranes are disclosed in U.S. Pat. Nos. 3,744,642: 3,951,815; 4,005,012; and 4,039,440. Continuing developments in the art have led to improved membranes which can be used at relatively low transmembrane pressures. U.S. Pat. No. 4,259,183 describes certain composite membranes having a crosslinked polyamide discriminating layer. The discriminating layer is prepared by the interfacial polymerization of a water-soluble secondary amine and a water-insoluble polyfunctional acyl halide.

The preferred membranes described in U.S. Pat. No. 4,259,183 possess certain unusual properties. These membranes exhibit a significant water flux at relatively low transmembrane pressures and also are ion selective. The patented membranes show much greater rejection of multivalent anion salts than of monovalent anion salts. Accordingly, such membranes are useful for applications such as water softening where it is desirable to remove such salts.

Other thin film composite polyamide membranes have been developed for specific reverse osmosis applications. U.S. Pat. No. 4,277,344 describes certain composite membranes having a discriminating layer prepared by interfacial polymerization of trimesoyl chloride optionally with other acyl halides and a monomeric aromatic diamine or polyamine. These membranes have been found to have superior water flux while maintaining a very high sodium chloride rejection in reverse osmosis applications.

Difficulties have been encountered in the preparation of composite polyamide membranes. Many substrate materials, for example polysulfone supports, must be properly wetted to promote uniform coating of the substrate with the aqueous phase involved in the interfacial polymerization. Surfactants, such as sodium lauryl sulfate, can be used to promote this wetting. However, the presence of surfactants can lead to undesirable discontinuities or defects in the discriminating layer. It is desirable to avoid too high a concentration of a conventional surface active agent, such as sodium lauryl sulfate, as this may deleteriously affect the desired interfacial polymerization. Other surfactants and wetting agents, for example polyvinyl alcohol, have been used in the manufacture of polyamide composite membranes. However, it has been found that these wetting agents may lead to reduced chemical resistance of the membrane discriminating layer.

A method of reproducibly fabricating membranes useful in water softening applications having a high water flux and good chemical resistance is desirable. In particular, membranes being tolerant of basic pH's, for example a pH of 12 or 13 for a period of several hours, are of commercial interest. Such basic solutions may be encountered in cleaning these membranes with conventional reagents.

SUMMARY OF THE INVENTION

A process for making composite reverse osmosis membranes having a crosslinked polyamide discriminating layer made by interfacial polymerization of a polyfunctional, essentially water-soluble primary or secondary amine in an aqueous solution with a relatively water-insoluble polyfunctional acyl halide having an average acyl halide functionality of at least two in an organic solution has now been discovered. In this improved process, an effective amount of a polymeric wetting agent bearing a plurality of ionic moieties is employed in the aqueous solution, so as to produce a composite reverse osmosis membrane having superior caustic resistance.

The composite reverse osmosis membranes of this invention are believed in preferred embodiments to incorporate the ionic polymeric wetting agent into the membrane structure and thus comprise novel compositions. The superiority of these compositions over those available in the prior art is seen in the improved caustic resistance of the compositions in preferred embodiments, which is achieved without a significant loss of water flux through the membrane. In addition, the discriminating layer shows excellent adhesion to the substrate.

In another aspect, the subject invention relates to thin film composite membranes having polyamide discriminating layers of a novel composition and properties.

In yet another aspect, the subject invention relates to the use of membranes prepared as described herein in a reverse osmosis process to separate sodium chloride or other monovalent anion salts from organic compounds and/or divalent or polyvalent anion salts. Because the sodium chloride rejection of certain preferred membranes is relatively low, the transmembrane pressure required to overcome the osmotic pressure in a reverse osmosis process is much lower than is true with other conventional reverse osmosis membranes. For example, over 80 percent of the osmotic pressure of sea water is attributable to the sodium chloride present. If a low rejection of sodium chloride and other monovalent anion salts is acceptable, the subject membrane can be used at a much lower pressure than many prior art membranes which have a higher sodium chloride rejection. For example, such membranes may be used to concentrate magnesium sulfate present in sea water.

DETAILED DESCRIPTION OF THE INVENTION

Crosslinked polyamide thin film composite membranes prepared from polyfunctional acyl halides and compounds bearing at least two primary or secondary amines are well known in the art. Such polyamides are conveniently crosslinked by requiring either the acyl halide reactant or the polyamine reactant to bear an average of more than two reactive groups on the reactant. U.S. Pat. No. 4,259,183, which is incorporated herein by reference, describes methods of making such membranes from compounds bearing secondary amines and the performance of the resulting membranes.

In a conventional process for making such polyamide membranes, an aqueous solution containing at least one polyfunctional, water-soluble compound bearing a total of at least two reactive amine groups is prepared. Primary or secondary amine groups which are reactive with acyl halide moieties are referred to herein as reactive amine groups and the compound bearing at least two reactive amine groups is referred to as a polyamine. It is operable to use polymeric or oligomeric polyamines, but preferably the polyamine is essentially monomeric. Preferably, this polyamine compound is present at a concentration in a range from about 0.05 to about 5 percent by weight, more preferably from about 1 to about 2 percent by weight. It should be noted that the aqueous solution containing the polyamine can optionally contain cosolvents or other solubility modifiers, but this is not generally preferred.

The polyamine reactant which is polymerized to form the discriminating layer may be any compound bearing two or more amine groups which are reactive with acyl halides. Preferably, said polyfunctional amine compound is of an aliphatic or cycloaliphatic nature. More preferably, the primary and/or secondary amine compound is piperazine, a substituted piperazine derivative having two reactive amine groups, a cyclohexane bearing at least two reactive amine or aminoalkyl groups or a piperidine bearing at least one reactive amine or aminoalkyl group. For example, 2-methylpiperazine, 2,5-dimethylpiperazine, 1,3-cyclohexanebis(methylamine), 1,2-diaminocyclohexane, 1,3-diaminocyclohexane, 4-aminopiperidine, 3-aminopiperidine, bipiperidine or 1,4-diaminocyclohexane are operable with piperazine and 4-aminomethylpiperidine being preferred. N,N'-dialkyl-substituted alkylene diamines, linear poly(ethylenimine) and aromatic amines, such as phenylene diamine, are operable as amine reactants but are generally less preferred than the cycloaliphatic amines, such as amine-substituted piperidine, piperazine and their substituted derivatives. Mixtures of different amines can also be employed. A variety of amines operable herein are described in U.S. Pat. No. 4,337,154 as Compound B, which is incorporated herein by reference.

By "essentially water-soluble" it is meant that the amine reactant herein possesses a measurable solubility in water, for example, greater than about 0.01 weight percent, preferably greater than 1.0 weight percent under standard ambient conditions.

The term "ionic" refers to groups which bear cationic and/or anionic charges. Especially preferred are onium groups.

By the term "onium" is meant a cationic group selected from sulfonium, quaternary ammonium, pyridinium, phosphonium, iodonium, oxonium, thiazolinium, imidazolinium, sulfoxonium, isothiouronium, azetidinium or diazonium. Especially preferred are sulfonium or quaternary ammonium moieties.

The term "essentially monomeric" refers to chemical compounds capable of chain extension, crosslinking or other polymerization reactions. The essentially monomeric compounds are relatively low in molecular weight and should be readily soluble in the solvent system in which they are brought together with the other reactive monomer in the interfacial polymerization reaction. The essentially monomeric compounds can include a minor amount of oligomers or a small number of repeating units. For example, the amine or acyl halide compounds can be reacted to form oligomers by linking said compounds with a difunctional chain extender or trifunctional crosslinking agent.

"Chain extension" refers to a polymerization reaction which is preferably intermolecular in nature and which forms linear chains of repeating monomeric groups. "Crosslinking" refers to reactions in which branched or network polymers are formed.

By the term "wetting agent" it is meant that the ionic polymer is active in the interfacial region between the aqueous and organic phases during polymerization. When hydrophobic substrates are used, the ionic polymeric wetting agent is effective to reduce the contact angle of the aqueous polyamine solution on the substrate surface on which the discriminating layer is formed. The ionic polymeric wetting agent in certain embodiments may catalyze the interfacial polymerization, may modify the membrane morphology, may react with the discriminating layer or otherwise enhance membrane characteristics.

Hydrogen chloride is generated during formation of the polyamide via reaction of an acid halide with an amine. In addition to an amine, the aqueous solution preferably includes an acid acceptor. Suitable acceptors include sodium hydroxide, sodium carbonate or tertiary amines. Triethylamine or N,N'-dimethylpiperazine are preferred acid acceptors. The acid acceptor is preferably present in an amount such that there will be an excess of acid acceptor groups present relative to acid groups generated in the reaction. Where excess amine reactants are present, this excess will also serve as an acid acceptor. In general, the acid acceptor, in addition to the amine reactant, can be present in a concentration from about 0.05 to about 5 weight percent, more preferably about 1 to about 2 weight percent.

The polyfunctional acyl halide reactant used to prepare the discriminating layer is advantageously a triacyl halide or mixture of a triacyl halide with a diacyl halide. Where the polyamine is trifunctional or more highly functional, a diacyl halide reactant may be used. Conveniently, the halide is either bromide or chloride. Aliphatic acyl halides are operable but aromatic acyl halides are generally preferred. Particularly preferred is trimesoyl chloride or a mixture of trimesoyl chloride and isophthaloyl chloride or terephthaloyl chloride. Preferably, at least about 45 mole percent, more preferably at least 75 mole percent, of the acyl halide is trimesoyl chloride. The acyl halide compound should desirably be soluble to a substantial extent in organic solvent which is not very soluble or is immiscible with water. Suitable solvents for the acyl halides include alkanes having from 5 to 8 carbons and halogenated aliphatic compounds having from 1 to 3 carbons. Preferably, the acyl halide should be present in the organic solution in a weight percent of from about 0.03 to about 5 percent, more preferably from about 0.06 to about 0.3 weight percent. Optionally, the acyl halide can be present in a gas phase, but this is not generally preferred.

The discriminating layer described herein is formed on a porous substrate of the type conventionally used in composite reverse osmosis membranes. Preferred supports include those prepared from polysulfone, chlorinated polyvinyl chloride, polyethersulfone, polyvinylidene fluoride, styrene acrylonitrile copolymers, cellulose esters and the like. Polysulfone substrates have been found to be particularly effective support materials for the membranes of this invention. Preparation of such porous substrates is described in U.S. Pat. Nos. 3,926,798; 4,039,440 and 4,277,344, the disclosures of which are incorporated herein by reference. The method of forming discriminating layers described herein is especially effective with hydrophobic surfaces.

The porosity of the support is advantageously as great as possible while retaining the desired physical strength. Conveniently, the porous support has a porosity in the range from about 40 to about 80 percent. Preferably, the support is asymmetric in porosity and has a denser region on which the discriminating layer is formed. Preferably, the mean pore diameter of the pores on the surface on which the discriminating layer is formed should be in the range from about 15 to 1,000 Å, more preferably about 25 to about 300 Å.

In one preferred embodiment of this invention, piperazine is employed in the form of an aqueous solution with a concentration of piperazine being in the range from about 0.1 to about 5 percent by weight, more preferably about 0.5 to about 3 percent by weight. Piperazine itself will act as an acceptor for the hydrogen chloride or optionally an effective amount of another acid acceptor can be present in the aqueous solution.

In another preferred embodiment of the invention, 4-aminomethylpiperidine ("AMP") can be employed as the amine in a manner similar to piperazine. Surprisingly, it has been found that AMP can be used to produce membranes having excellent rejection of salts of divalent anions and good rejection of sodium chloride, whereas piperazine membranes show lower rejection of sodium chloride but similar rejection of divalent anion salts. Both AMP and piperazine membranes also exhibit good water flux and chemical resistance. The selection of either AMP or piperazine as the polyamine allows the production of membranes with excellent rejection of divalent anion salts and variable sodium chloride rejection.

In the method of this invention, the support should be either pretreated with the ionic polymeric wetting agents described hereinafter or an effective amount of the wetting agent should be present in the aqueous solution containing the polyamine. Generally, it is preferred to use the ionic polymeric wetting agent in the solution containing the amine, because pretreatment of the substrate requires higher concentrations of wetting agents. The optimum concentration of the ionic polymeric wetting agent for a given application may be determined empirically. Preferably, the ionic polymeric wetting agent is present in the range from about 250 to about 20,000 parts per million (ppm) by weight on an active solids basis, more preferably in the range from about 1,000 to about 5,000 ppm on an active solids basis. In some preferred embodiments, it has been found that the wetting agent is advantageously present in an amount which reduces the surface tension of the aqueous phase at the liquid air interface to a value in the range from about 40 to about 70 dynes per centimeter, more preferably about 45 to about 60 dynes per centimeter.

Application of a polyfunctional amine solution to the porous support is conveniently accomplished by any conventional technique employed in the art, such as immersing the support in solution or spraying the solution on the support. It is generally convenient to apply the solution of the polyamine to the support by simply immersing the support in an aqueous solution of the polyamine. Removal of excess aqueous solution is accomplished by rolling or otherwise applying pressure to the substrate to eliminate excess solution without damaging the substrate. Alternatively, the substrate may be allowed to drain vertically, may be subjected to a dry gas flow or centrifuged to eliminate excess liquid.

The substrate may take any configuration conveniently used in the prior art to prepare composite membranes. For example, the substrate may be used in the form of a flat sheet, a hollow fiber, or a tubular structure. Methods of forming the substrate in such configurations are generally known in the prior art.

Reaction between the amine and the acyl halide can be conveniently conducted under conventional conditions for interfacial reaction between the polyamine and the acyl halide. Preferably, the acyl halide is applied to the substrate in an organic solvent which is substantially insoluble in the aqueous solution. In these embodiments, the acyl halide solution can be applied to the substrates by the same technique used previously for the amine or by other known methods.

Preferably, the acyl halide and polyamine will react at temperatures in the range from about 0° to about 50° C., more preferably temperatures in the range from about 10° to about 30° C. The reaction is conveniently conducted at atmospheric pressure.

The reaction between the acyl halide and polyamine generally occurs quickly. A reaction time of about 1 to about 300 seconds, preferably about 10 to about 60 seconds, is generally sufficient to form the desired thin discriminating layer. Since flux through the discriminating layer is inversely proportional to thickness, a thin layer free from defects is desirable. The resulting composite consisting of the porous substrate and the discriminating layer adherent thereon can then conveniently be air-dried at a temperature in a range from about 20° to about 130° C. for a period of about 1 to 30 minutes.

The ionic polymeric wetting agents used herein are advantageously polymers bearing a plurality of cationic and/or anionic groups. Such polymers can be prepared by either reaction of suitable monomers or by treatment of a polymer with a reagent which will form cationic or anionic groups. The polymeric wetting agent is a polymer bearing a plurality of pendant ionic groups. Amphoteric polymeric wetting agents having both anionic and cationic groups are operable provided they afford the desired interfacial activity. Anionic groups, such as sulfonate or carboxylate groups, are operable. Cationic groups, such as onium moieties, are preferred. Preferably, the ionic polymeric wetting agent has a mole percent of the moiety containing the onium or anionic group in the range from about 1 to about 100 percent, more preferably 5 to about 95 percent, most preferably 10 to about 90 percent. Cationic polymeric wetting agents are described in U.S. Pat. Nos. 4,337,185; 4.426,489 and 4,525,526, which are incorporated herein by reference. Anionic polymeric wetting agents are well known. Optionally, a mixture of polymeric wetting agents can be employed but the wetting agents desirably should be of like charge. It is operable, but not generally preferred to use the ionic polymeric wetting agents in combination with conventional wetting agents or surfactants, such as polyvinyl alcohol.

Desirably, the cationic or anionic group on the polymer is sufficiently stable to be conveniently combined with the other reactants. For example, aromatic diazonium polymers are more stable than aliphatic diazonium and generally are more suitable in this process. The cationic group which the polymer bears is preferably a sulfonium, quaternary ammonium, azetidinium or phosphonium. More preferably, the cationic group is a sulfonium moiety or quaternary ammonium. Most preferably, the cationic group is sulfonium. The onium group in addition to the moiety bonding it to the polymer bears hydrocarbon radicals in sufficient number to give it the desired valence. These hydrocarbon radicals can optionally bear other substituents which do not deleteriously affect the instant reactions. Particularly preferred are polymers bearing benzyl dialkylsulfonium or benzyl trialkyl ammonium moieties wherein each alkyl group has from 1 to 4 carbon atoms, more preferably from 1 to 2. Optionally, in place of two alkyl groups, a single alkylene group may be present which forms a 5- or 6-membered ring containing the sulfonium or ammonium.

Preferably, the polymeric wetting agents have a backbone resistant to hydrolysis at conditions to which the membrane is normally exposed. The polymeric wetting agent may be a condensation polymer, but preferably is a vinyl addition polymer. Illustrative condensation polymers include polyalkyleneimine or polyalkylene ethers bearing ionic groups. Such polymers are well known in the art.

Suitable polymeric wetting agents can be prepared by reaction of vinylbenzyl dialkyl sulfonium or trialkyl ammonium salts with other compatible ethylenically unsaturated monomers. Preferably, the ionic polymeric wetting agent is derived from about 5 to about 100 mole percent of moieties bearing an onium group, more preferably from about 5 to about 95 mole percent of such moieties, most preferably from about 10 to about 90 mole percent. Compatible ethylenically unsaturated monomers are those monomers which do not deleteriously affect the properties of the membrane discriminating layer in which the wetting agent will reside in the product. Suitable compatible monomers include methacrylic acid, hydroxyethyl methacrylate, hydroxypropyl methacrylate, aminoethyl methacrylate, methyl methacrylate and other esters of methacrylic acid. Methacrylic acid esters bearing hydrocarbon or organic moieties containing from about 1 to about 36 carbon atoms are particularly preferred in that such moieties can be used to impart activity to the polymer as a surface active agent. For example, compatible monomers of the following formulae can be used:

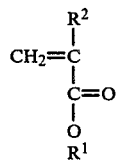

wherein $R^1$ is an alkyl from 1 to 36 carbon atoms, more preferably an alkyl of from 1 to 12 carbon atoms, most preferably $C_1$ to $C_4$ alkyl,

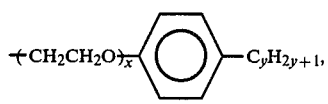

$+CH_2CH_2O\rightarrow_x C_yH_{2y+1}$, wherein x is an integer from 1 to about 20 and y is an integer from 1 to about 18 and $R^2$ is hydrogen or methyl, more preferably methyl because of the greater hydrolytic stability of the resulting polymer. Generally, the presence of sidechain hydrophobic groups in the polymeric wetting agents is operable but not preferred. In a preferred embodiment of the invention, in addition to the onium bearing moiety, the polymer is derived from about 0 to about 95 mole percent of a methacrylic acid ester and a remaining amount of other compatible monomers. Preferably, the methacrylic acid ester is a $C_1$ to $C_4$ alkyl ester of methacrylic acid. Methyl methacrylate is especially preferred. Mixtures of compatible monomers are also operable.

Where the polyamine is piperazine, a polymeric wetting agent derived from about 5 to about 100 mole percent of a vinylbenzyl sulfonium salt, about 0 to about 95 mole percent of a methacrylic acid ester and a remaining amount of a compatible monomer is preferred. When the polyamine is AMP, a polymeric wetting agent derived from about 5 to about 95 mole percent of a vinylbenzyl sulfonium salt, about 0 to about 95 mole percent methacrylic acid and a remaining amount of a compatible monomer is preferred.

Not all of the onium groups described herein are equally reactive. Generally, sulfonium or diazonium groups are believed to react with the discriminating layer more readily than quaternary ammonium groups. In preferred embodiments of the invention, it is believed that the ionic polymeric wetting agent at least partially reacts with moieties bearing labile hydrogens in the membrane. Optionally, the ionic polymeric wetting agent can bear some primary or secondary amine groups or other groups reactive with an acyl halide or amine, such that the ionic polymeric wetting agent will be reacted into the polyamide formed.

In certain embodiments, radiation curable moieties can be present in the reactants used to form the discriminating layer. Actinic or other radiation can then be used to promote curing of this layer.

The polymeric wetting agent described herein can also be prepared by reaction of vinylbenzyl chloride with compatible monomers to form a polymer. This polymer can then be reacted with precursors of the desired cationic group or groups. More than one type of onium group may be introduced. For example, a vinylbenzyl chloride polymer can be reacted with a dialkyl sulfide to prepare polymers bearing benzyl dialkyl sulfonium groups. Alternatively, the vinylbenzyl chloride polymer can be reacted with a tertiary amine to form a quaternary ammonium group. Optionally, the tertiary amine may bear a hydrophobic group to impart the desired interfacial activity to the polymer.

The molecular weight of the polymeric wetting agent can affect the final properties of the membrane discriminating layer. The optimum molecular weight will vary depending upon the nature of the microporous support, the mole percent onium moieties in the polymeric wetting agent, the polyamine and acyl halide reactants employed and other factors. The optimum molecular weight for a particular wetting agent described herein can be readily determined empirically.

The cationic groups described herein will have an anionic counterion associated therewith. Generally, the anionic counterion is not critical so long as the membrane characteristics of the resulting product are not deleteriously affected. Conveniently, the associated anionic counterion is a halide, bicarbonate or hydroxide moiety. Especially preferred are chloride or hydroxide anions or inner salts of methacrylic acid.

The improved membrane compositions disclosed herein have been found to exhibit a high rejection for salts of divalent or polyvalent anions, particularly for magnesium sulfate. The subject membranes are particularly useful for applications such as brackish water desalting, food processing, recovery of chemicals from electroplating solutions, softening of hard water for municipal or home use or for boiler feed water treatment.

The ionic polymeric wetting agent in preferred embodiments is effective to improve the membrane characteristics. Characteristics improved depend on the specific membrane composition, but can include higher water flux, improved salt rejection, better pH tolerance and/or improved adhesion of the discriminating layer to the porous support.

Caustic resistance is determined for the purposes herein by a standard test. This comprises contacting the membrane on its feed side with an aqueous 0.1 normal sodium hydroxide solution (pH of 13) at a pressure of 225 psi and a temperature of 20° to 25° C. At regular intervals, the magnesium sulfate rejection of the membrane was tested at neutral pH. The caustic treatment continued until such time as the rejection of the magnesium sulfate dropped below 90 percent. Preferred embodiments of this invention exhibit at least about 90 percent rejection of magnesium sulfate after 48 hours of exposure to 0.1 normal sodium hydroxide. Polyvinyl alcohol, when used as a wetting agent as taught in U.S. Pat. No. 4,619,767 in formation of membranes, has been found to afford a high water flux. Polyvinyl alcohol wetting agents have been found generally deficient in that the resulting membranes have reduced caustic resistance.

In preferred embodiments of this invention, the subject membranes exhibit water fluxes of at least about 12 gallons per square foot per day (gfd), preferably at least about 20 gfd, more preferably at least about 30 gfd and most preferably at least about 40 gfd, at standard magnesium sulfate test conditions. Moreover, said membranes in preferred embodiments exhibit a magnesium sulfate rejection of at least about 90 percent, preferably at least about 95 percent, more preferably at least about 97 percent, most preferably at least about 99 percent, at the same conditions. The standard magnesium sulfate test conditions generally used herein are a feed pressure of 225 pounds per square inch gauge, a concentraton of magnesium sulfate of 0.2 percent, a temperature of 20° to 25° C., a pH in the range of 6 to 7, a recovery of about 1 percent for flat sheets and a minimum test time of at least one hour to permit performance to stabilize. Preferably, the membrane removes at least 80 mole percent of the sulfate salts present in an aqueous feed solution contacting the membrane.

The following examples are presented to illustrate the invention. One of ordinary skill in the art will appreciate that the invention described herein is not limited to the specifics presented in the examples. All parts and percentages are by weight unless otherwise indicated.

General Membrane Fabrication Procedure used in Examples

A polysulfone substrate was prepared by dissolving 45 g of polysulfone (UDEL ®, grade P-3500, a product of Union Carbide Corporation) in 255 g of dimethylformamide to yield a 15 weight percent solution. The polysulfone solution was degassed at reduced pressure and a bead of the polymer solution was placed on a glass plate in sufficient quantity that a 6 mil drawdown bar created a film of uniform thickness. The plate was then immersed in deionized water to gel the film. Three-inch diameter discs of said polysulfone were cut from the sheet while still wet and kept immersed in water until the membrane was to be prepared.

A solution was prepared containing 4 percent piperazine by weight and 4 percent triethylamine by weight in deionized water. An aqueous solution of a wetting agent at a loading equal to 2,000 ppm on an active solids basis by weight was prepared in deionized water. To 50 milliliters (ml) of the aqueous solution of the wetting agent was added 50 ml of the piperazine/triethylamine solution. This aqueous solution was generally used the day it was prepared. The resulting solution was filtered and a 3-inch diameter sample of a microporous polysulfone support film was immersed in the filtered solution for 1 to 2 minutes.

In a similar manner to the piperazine, solutions of 2 weight percent of aliphatic diamines or other diamines with 2 weight percent N,N'-dimethylpiperazine (DMP) as an acid acceptor were prepared. To these solutions generally was added 0.1 percent by weight (unless otherwise indicated) of the onium wetting agent specified in the examples.

The polysulfone support was removed from the amine solution, drained and placed on a glass plate. A smooth rubber roller was used to gently squeeze excess solution from the polysulfone support.

The coated polysulfone support was immersed in a solution of 0.1 weight to volume percent trimesoyl chloride in 1,1,2-trichlorotrifluoroethane. After 1 minute the support was removed from the trimesoyl chloride solution. The membrane was allowed to drain off excess liquid, and the membrane was air-dried at room temperature for at least 12 hours prior to testing.

EXAMPLES 1-14

Several ionic polymeric wetting agents were employed in the procedure outlined hereinbefore to prepare membranes from piperazine and trimesoyl chloride with a triethylamine acid acceptor. These wetting agents were prepared by conventional vinyl addition polymerization of the following monomers: hydroxyethyl methacrylate (HEMA), vinylbenzyl dimethyl sulfonium (VBDMS), p-nonylphenoxynonaethoxy ethyl methacrylate (9N-10MA), methacrylic acid (MAA) and aminoethyl methacrylate (AEM). The vinylbenzyl dimethyl sulfonium salt used in Example 13 to prepare the wetting agent was in the hydroxide form, but in the other examples was in the chloride form. The monomers were used in the ratios tabulated in Table I. Each composition was tested in several samples and the water flux and magnesium sulfate rejections tabulated are generally averages of the best results. In some instances, subsequent efforts to repeat the examples yielded poorer results than those reported, but this is believed attributable to variations in the experimental procedure and conditions. The water flux in gallons per square foot per day (gfd) and the magnesium sulfate rejection in percent were determined at the standard magnesium sulfate test conditions outlined hereinbefore. The caustic resistance of all samples having magnesium sulfate rejections of at least 90 percent in initial baseline tests were tested at the conditions outlined hereinbefore until the magnesium sulfate rejection dropped below about 90 percent. Because the RO test performance of individual samples of a given composition sometimes varied considerably, the average salt rejections for Examples 4-6 were less than 90 percent. Examples 4-6 each represent individual samples with rejections greater than 90 percent which met the criterion for a caustic resistance test and such tests were conducted on said samples. The caustic resistance in days and water flux in gallons per square foot per day are tabulated in Table I.

TABLE I

| | Wetting Agent (Weight Percent Comonomer) | | | | | Test Results | | |
|---|---|---|---|---|---|---|---|---|
| Example | HEMA | VBDMS | 9N10 | MAA | AEM | Flux (gfd) at 25° C. | Salt Rejection (Percent) | Caustic Resis. pH 13 Feed (Days) |
| 1 | 80 | 10 | 10 | | | 23 | 92 | <1 |
| 2 | 50 | 40 | 10 | | | 11 | 94 | <1 |
| 3 | 50 | 50 | | | | 26 | 91 | 2 |
| 4 | 40 | 50 | 10 | | | 11 | 70 | <1 |
| 5 | 20 | 70 | 10 | | | 18 | 89 | <1 |
| 6 | | 100 | | | | 20 | 88 | 3 |
| 7 | 73 | 15 | 8 | 4 | | 25 | 98.7 | 3 |
| 8 | 49 | 32 | 8 | 12 | | 16 | 94 | 3 |
| 9 | 34 | 40 | 10 | 16 | | 21 | 96 | <1 |
| 10 | 20 | 50 | 10 | 20 | | 14 | 98.8 | 2 |
| 11 | 6 | 60 | 10 | 24 | | 17 | 98.6 | 3 |
| 12 | | 72 | | 28 | | 26 | 98.6 | 4 |
| 13* | | 70.6 | | 28.3 | 1.1 | 32 | 97.8 | 4 |
| 14** | | 70.6 | | 28.3 | 1.1 | 29 | 98 | 5 |

*Hydroxide form.
**Chloride form.

With the exception of Examples 4, 5 and 6, the wetting agents tabulated in Table I possess excellent water flux and magnesium sulfate rejection. The reduced magnesium sulfate rejection observed in Examples 4, 5 and 6 may be due to defects in the membrane or other causes and do not necessarily indicate that these wetting agents are not suitable for preparation of membranes. The samples represented in Examples 12, 13 and 14 possess a particularly desirable combination of water flux, magnesium sulfate rejection and caustic resistance.

EXAMPLES 15-17

In a series of examples similar to Example 1, composite membranes were prepared using a wetting agent of a different composition. The composition of this wetting agent was 75.5 mole percent methyl methacrylate (MMA), 16 mole percent VBDMS, 5.3 mole percent of a monomer of the Formula I and 3.2 mole percent of a monomer of the Formula II:

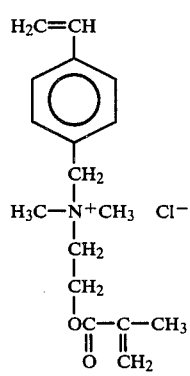

(I)

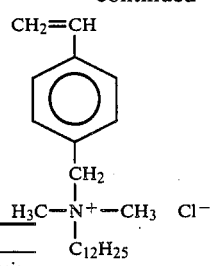

(II)

The percent wetting agent was varied from 0.1 to 0.4 percent on the basis of active solids. The water flux and magnesium sulfate rejection recorded in standard test are tabulated in Table II for each membrane.

TABLE II

| | Wetting Agent (Percent) | Test Results | |
|---|---|---|---|
| Example | | Flux (gfd) | Salt Rejection (Percent) |
| 15 | 0.1 | 23 | 98 |
| 16 | 0.2 | 22 | 97 |
| 17 | 0.4 | 25 | 96 |

It can be seen from Table II that variations in the loading of the wetting agent over a four-fold range did not significantly change the properties of the resulting membrane.

EXAMPLE 18

In this example, a membrane was prepared in generally the same manner as Example 15, except that the concentration of piperazine and triethylamine in the aqueous phase was 1 percent of each. The resulting membrane had a water flux of 22 gfd and a magnesium sulfate rejection of 98 percent.

EXAMPLES 19 AND 20

In a manner generally similar to Example 12, two composite membranes were prepared. In Example 19, the membrane was dried at ambient temperature in air for 12 hours prior to testing. In Example 20 the membrane was dried at 110° C. for 10 minutes instead of air drying. The water flux and salt rejection range obtained for several membranes prepared and dried by each of these methods are presented in Table III as determined at a pressure of 285 psi and otherwise at standard conditions. It is seen that the membrane which was oven dried possessed a moderately lower water flux than the one dried in air.

TABLE III

| Example | Drying Method | Test Results Flux (gfd) | Salt Rejection (Percent) |
| --- | --- | --- | --- |
| 19 | air | 40-50 | 97-99 |
| 20 | oven | 34-39 | 98-99 |

EXAMPLES 21 AND 22

Membranes similar to those prepared in Examples 12 and 13 were tested to determine both the magnesium sulfate rejection and sodium chloride rejection for said membranes. The magnesium sulfate test was the standard test described hereinbefore. The sodium chloride rejection was determined using an aqueous feed solution containing 0.2 percent sodium chloride at 225 psi transmembrane pressure at a temperature of 20° to 25° C. with the test lasting 1 hour to allow the membrane performance to stabilize. The test results obtained for both the magnesium sulfate and sodium chloride test solutions are tabulated in Table IV.

TABLE IV

| Example | Mole Percent Comonomer VBDMS/MAA/AEM | Test Results | | | |
| --- | --- | --- | --- | --- | --- |
| | | $MgSO_4$ | | NaCl | |
| | | Flux | Salt Rejection (Percent) | Flux | Salt Rejection (Percent) |
| 21 | 72/28/0 | 25 | 97 | 28 | 53 |
| 22 | 70.6/28.3/1.1 | 22 | 99 | 24 | 62 |

It is noteworthy that the sodium chloride rejection of both membranes is much lower than the magnesium sulfate rejection. The water flux in both cases is comparable whether the feed solution is a sodium chloride solution or a magnesium sulfate solution.

EXAMPLES 23-30

Polysulfone substrates were coated with 2 weight percent solutions of an aliphatic diamine, 0.1 percent of a copolymer which is 71.4 weight percent VBDMS (chloride form) and 28.6 weight percent methacrylic acid and 2 weight percent of DMP. The aliphatic diamines were selected from 1,3-propanediamine (PDA), 1,4-butanediamine (BDA), 1,6-hexanediamine (HDA), N,N'-dimethyl-1,6-hexanediamine (DMHDA) and N,N'-dimethyl ethylenediamine (DMEDA). The coated substrates were contacted with 0.1 percent trimesoyl chloride in trichlorotrifluoroethane as described hereinbefore. The $MgSO_4$ rejection of a 0.2 percent solution at 200 and/or 600 psig and water flux were determined for each membrane. Because hand-coating frequently led to defective membranes, only the best results are tabulated in Table V.

TABLE V

| Example | Amine | Feed Pressure | $MgSO_4$ Rejection | Flux (gfd) |
| --- | --- | --- | --- | --- |
| 23 | PDA | 200 | 95 | 4 |
| 24 | PDA | 600 | 95 | 18 |
| 25 | BDA | 200 | 83 | 1 |
| 26 | BDA | 600 | 94 | 7 |
| 27 | HDA | 200 | 55 | 1 |
| 28 | HDA | 600 | 79 | 1 |

TABLE V-continued

| Example | Amine | Feed Pressure | $MgSO_4$ Rejection | Flux (gfd) |
| --- | --- | --- | --- | --- |
| 29 | DMEDA | 200 | 49 | 26 |
| 30 | DMHDA | 200 | 85 | 8 |

EXAMPLES 31-36

In a manner generally similar to Examples 23-30, membranes were prepared using another onium wetting agent. This onium wetting agent was a polymer of the following monomers (percents are by weight): 20.9 percent methy methacrylate (MMA), 62.5 percent VBDMS (in chloride form), 8.9 percent of the monomer of Formula I in Example 15 and 7.7 percent of a cationic vinyl surfactant as shown in Formula II in Example 15. The results are tabulated in Table VI.

TABLE VI

| Example | Amine | Feed Pressure | $MgSO_4$ Rejection | Flux (gfd) |
| --- | --- | --- | --- | --- |
| 31 | PDA | 600 | 99 | 5 |
| 32 | BDA | 600 | 96 | 2 |
| 33 | HDA | 200 | 42 | 1 |
| 34 | HDA | 600 | 90 | 2 |
| 35 | DMEDA | 200 | 53 | 29 |
| 36 | DMHDA | 200 | 86 | 9 |

EXAMPLES 37-43

In a manner generally similar to Examples 23-30, membranes were prepared using another wetting agent. This wetting agent was a polymer of the following monomers (percents are by weight): 55.2 percent MMA, 25 percent of VBDMS (in chloride form), 12 percent of monomer of Formula I in Example 15 and 8.8 percent of a cationic vinyl surfactant (as shown in Formula II in Example 15). The results are tabulated in Table VII.

TABLE VII

| Example | Amine | Feed Pressure | $MgSO_4$ Rejection | Flux (gfd) |
| --- | --- | --- | --- | --- |
| 37 | PDA | 200 | 98 | 1 |
| 38 | PDA | 600 | 98 | 6 |
| 39 | BDA | 200 | 68 | 3 |
| 40 | BDA | 600 | 90 | 2 |
| 41 | HDA | 600 | 73 | 1 |
| 42 | DMEDA | 200 | 50 | 20 |
| 43 | DMHDA | 200 | 87 | 9 |

EXAMPLES 44 and 45

In the general manner of Example 1, composite membranes were prepared from piperazine and trimesoyl chloride, but quaternary ammonium wetting agents were used. The wetting agent in Example 44 was a homopolymer of vinylbenzyl trimethyl ammonium chloride (VBTMAC) and in Example 45 was a copolymer of 71.1 weight percent VBTMAC and 28.9 weight percent MAA. The rejection of 0.2 percent $MgSO_4$ at 200 psig and water flux for the best results obtained are tabulated in Table VIII.

TABLE VIII

| Example | $MgSO_4$ Rejection | Flux (gfd) |
| --- | --- | --- |
| 44 | 55 | 13 |

TABLE VIII-continued

| Example | MgSO4 Rejection | Flux (gfd) |
|---|---|---|
| 45 | 98 | 19 |

These examples demonstrate that the properties of the wetting agent may need to be optimized for specific applications by addition of compatible monomers to modify hydrophobicity and charge density.

EXAMPLE 46

A water-soluble polyamine (sold by Diamond Shamrock as FIBRABON ® 35) containing a plurality of azetidinium groups was used as a wetting agent in the preparation of polymers otherwise similar to those in Example 45. This polymer is believed to have repeating units of the formula

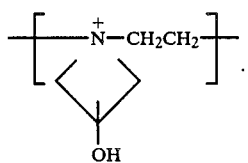

The resulting membrane when tested at 200 psig with 0.2 percent MgSO4 aqueous feed exhibited MgSO4 rejections of 98 percent and a water flux of 17 gfd.

EXAMPLES 47–55

Wetting agents similar to those in Example 15 were prepared with varying ratios of monomers. These wetting agents were used to prepare membranes in a manner similar to that described in Example 1. The MgSO4 rejection, water flux and caustic resistance were measured as in Example 1. The results are tabulated in Table IX, as is the monomer ratio in mole percent for each wetting agent.

TABLE IX

| Example | Wetting Agent** MMA/VBDMS/- Formula I (Example 15)/- Formula II (Example 15) | Flux (gfd) | MgSO4 Rejection | Caustic Resis. (Days) |
|---|---|---|---|---|
| 47 | 3/91.5/0.2/5.3 | 16 | 98 | 4 |
| 48 | 3/82.5/9.2/5.3 | 16 | 97 | 4 |
| 49 | 3/76.5/15.2/5.3 | 15 | 83 | * |
| 50 | 16/75.0/3.7/5.3 | 18 | 98 | 5 |
| 51 | 38/52.9/3.8/5.3 | 16 | 98 | 4 |
| 52 | 49/45.5/0.2/5.3 | 16 | 94 | 4 |
| 53 | 64.5/15/15.2/5.3 | 20 | 85 | 3 |
| 54 | 75/16/3.7/5.3 | 26 | 80 | * |
| 55 | 79.5/15/0.2/15.3 | 20 | 93 | 4 |

*Not determined.
**In mole percent.

EXAMPLES 56–58

Using the wetting agent described in Example 12, a polysulfone substrate was imersed in an aqueous solution of 1,000, 500, 100 or 0 ppm of the agent. The support was rinsed with water and then immersed in a 2 percent piperazine/2 percent triethylamine aquous solution. The coated support was drained and pressed with a roller to remove excess liquid. The support was then contacted with 0.1 percent trimesoyl chloride in trifluorotrichloroethane per Example 1. The resulting membranes were tested with a 0.2 percent MgSO4 solution at 285 psi and results are tabulated in Table X. The ranges represent spread of duplicate tests.

TABLE X

| Example | Concentration of Wetting Agent | MgSO4 Rejection | Flux (gfd) |
|---|---|---|---|
| 56 | 1,000 | 91–98 | 24–37 |
| 57 | 500 | 97 | 24 |
| 58 | 100 | 30–50 | 80–90 |
| Control | 0 | 30–60 | 60–70 |

The data tabulated in Table X suggest that pretreatment of the substrate is effective to enhance rejection.

EXAMPLES 59–74

In a manner generally similar to Example 23, membranes were prepared by soaking a substrate in an aqueous solution of 2 percent of various diamines, 2 percent DMP and 0.1 percent (unless otherwise indicated) of one of two wetting agents. The diamines are 4-aminomethylpiperidine (4-AMP), 1,3-cyclohexanebis(-methylamine) (1,3-CHBMA), 1,2-diaminoethane (1,2-DAE), 1,2-diaminocyclohexane (1,2-DACH), 1,3-diamino-2-hydroxypropane (DAHP), diethylenetriamine (DETA), bipiperidine (BP), tris-(aminoethyl)amine (TAEA), bis(aminopropyl) piperazine (BAPP), 1,4-diaminocyclohexane (1,4-DACH). The wetting agents are those used in Examples 23 or 52 in the hydroxide form. The diamines were crosslinked with 0.1 percent trimesoyl chloride in trifluorotrichloroethane and cured at room temperature for the time indicated in Table XI in hours, except in Examples 61–63. In Examples 61–63, the membranes after room temperature cure were heated at 80° C. for 2 minutes. The water flux and rejection of each membrane was determined with separate aqueous soutions of 0.2 percent MgSO4 and in some cases 0.2 percent NaCl, both at 200 psi. The results, diamines, wetting agents and cure times are set forth in Table XI. The range of results are tabulated for multiple runs.

TABLE XI

| Example No. | Amines | Wetting Agent in Example (Weight Percent) | Curing Time (hr.) | 0.2 Percent MgSO4 | | 0.2 Percent NaCl | |
|---|---|---|---|---|---|---|---|
| | | | | Flux (gfd) | Rejection (Percent) | Flux (gfd) | Rejection (Percent) |
| 59 | 4-AMP | 23 (0.1%) | 2 | 23–26 | 93–99 | 21 | 70–74 |
| 60 | 4-AMP | 52 (1.5%) | 60 | 19–22 | 95 | * | * |
| 61 | 4-AMP | 52 (1.5%) | 2 min. | 17–19 | 96–97 | * | * |
| 62 | 4-AMP | 52 | 60 | 13 | 84 | * | * |

TABLE XI-continued

| Example No. | Amines | Wetting Agent in Example (Weight Percent) | Curing Time (hr.) | 0.2 Percent MgSO4 Flux (gfd) | 0.2 Percent MgSO4 Rejection (Percent) | 0.2 Percent NaCl Flux (gfd) | 0.2 Percent NaCl Rejection (Percent) |
|---|---|---|---|---|---|---|---|
| 63 | 4-AMP | 52 (0.1%) | 2 min. | 13 | 70 | * | * |
| Control | 4-AMP | None | 16 | 10 to 21 | 78–79 | * | * |
| 64 | 1,3-CHBMA | 23 (0.1%) | 16 | 8–13 | 86–93 | 5–13 | 75–85 |
| 65 | 1,3-CHBMA | 23 (2%) | 16 | 12–14 | 96 | 8–10 | 85–94 |
| 66 | 1,2-DAE | 23 (0.1%) | 2 | 1–5 | 99 | 1–4 | 95–97 |
| 67 | 1,2-t-DACH | 23 (0.1%) | 16 | 22–32 | 93–98 | 20–31 | 53–64 |
| 68 | DAHP | 23 (0.1%) | 16 | 2 | 97–99 | 2 | 86–90 |
| 69 | DETA | 23 (0.1%) | 16 | 6–9 | 82–85 | — | — |
| 70 | BP | 23 (0.1%) | 16 | 12–21 | 95–97 | 13–23 | 24–34 |
| 71 | TAEA | 23 (0.1%) | 60 | 4–10 | 97–99 | 4–10 | 79–87 |
| 72 | AEP | 23 (0.1%) | 16 | 2–3 | 97–98 | 2–3 | 50 |
| 73 | BAPP | 23 (0.1%) | 16 | 5–9 | 84–91 | 3–6 | 62–68 |
| 74 | 1,4-DACH | 23 (0.1%) | 16 | 10–18 | 98–99 | 11–27 | 71–81 |

*Not Determined.

The data in Table XI demonstrate that the subject wetting agents can be used with a variety of diamines to make composite membranes having excellent rejection for MgSO4 salts. The wetting agent described in Example 23 appeared to produce better membranes.

EXAMPLE 75

In a continuous process, the surface of a microporous polysulfone film coated on a nonwoven polyester web was saturated with an aqueous solution of 1.25 weight percent piperazine, 1.25 weight percent N,N'-dimethylpiperazine and 0.3 weight percent of a polymeric wetting agent derived from 25 mole percent methyl methacrylate, 68 mole percent VBDMS (in chloride form), 5.3 mole percent of the compound of Formula I in Example 15 and 1.7 mole percent of the compound of Formula II in Example 15. The polysulfone film, after removal of excess piperazine solution was contacted with a 0.2 weight to volume percent trimesoyl chloride in 1,1,2-trichlorotrifluoroethane solution for 1 minute. The treated film was then passed sequentially through an ambient water bath and an aqueous solution of 2 weight percent glycerine and 0.1 weight percent lauryl sulfate at 50° C. and then dried for 2 minutes at 75° C.

The resulting membrane was tested at a transmembrane pressure of 225 psi with an aqueous solution of 0.2 weight percent MgSO4 and an aqueous solution of 0.2 weight percent NaCl. The flux (normalized to 25° C.) and rejection, respectively, were 40 gfd and 99 percent rejection for MgSO4 and 44 gfd and 46 percent rejection for NaCl. This membrane also showed improved caustic resistance relative to membranes made without an ionic polymeric wetting agent, in this instance resisting a pH 13 caustic solution for 2 days under the standard test conditions.

What is claimed is:

1. A composite reverse osmosis membrane comprising a polyamide discriminating layer on a microporous support wherein the polyamide discriminating layer is derived by reaction of a polyamine selected from the group consisting of piperazine, a substituted piperazine, a substituted piperidine containing at least two reactive amine groups or a substituted cyclohexane bearing at least two reactive amine groups with an aromatic or cycloaliphatic acyl halide compound bearing an average of at least two reactive acyl halide groups in the presence of an ionic polymeric wetting agent bearing a plurality of onium groups wherein either the polyamine or the acyl halide bears an average of more than two of their respective reactive functional moieties.

2. The membrane as described in claim 1 wherein the polymeric wetting agent bears a plurality of dialkyl sulfonium groups.

3. The membrane as described in claim 2 wherein the polyamine reactant is piperazine.

4. The membrane as described in claim 3 wherein the acyl halide compound is at least about 50 mole percent trimesoyl chloride and a remaining amount of isophthaloyl chloride or terephthaloyl chloride.

5. The membrane as described in claim 4 wherein the membrane has a water flux of at least about 30 gfd and a magnesium sulfate rejection of at least about 97 percent when tested with a 0.2 percent magnesium sulfate aqueous solution at 225 psi transmembrane pressure at 25° C.

6. The membrane as described in claim 5 wherein the membrane maintains at least about 90 percent magnesium sulfate rejection at the same test conditions after exposure to 0.1 normal aqueous sodium hydroxide for 48 hours.

* * * * *